(12) United States Patent
Kang et al.

(10) Patent No.: US 8,838,651 B2
(45) Date of Patent: Sep. 16, 2014

(54) DATABASE SYSTEM TESTING

(75) Inventors: Changshen Kang, Ontario (CA); Enzo Cialini, Ontario (CA); David Godwin, Ontario (CA)

(73) Assignee: International Business Machines Corporation, Armonk, NY (US)

(*) Notice: Subject to any disclaimer, the term of this patent is extended or adjusted under 35 U.S.C. 154(b) by 716 days.

(21) Appl. No.: 11/972,541

(22) Filed: Jan. 10, 2008

(65) Prior Publication Data

US 2009/0182756 A1    Jul. 16, 2009

(51) Int. Cl.
*G06F 17/30* (2006.01)

(52) U.S. Cl.
CPC ................................ *G06F 17/30306* (2013.01)
USPC ........................................................ 707/803

(58) Field of Classification Search
CPC ...................................................... G06F 17/30
USPC ........................................................ 707/803
See application file for complete search history.

(56) References Cited

U.S. PATENT DOCUMENTS

| | | | |
|---|---|---|---|
| 5,664,173 A * | 9/1997 | Fast | 707/694 |
| 7,171,588 B2 * | 1/2007 | Friedman et al. | 714/38.12 |
| 7,984,031 B2 * | 7/2011 | Chordia et al. | 707/705 |
| 2002/0165952 A1 * | 11/2002 | Sewell et al. | 709/224 |
| 2004/0078684 A1 * | 4/2004 | Friedman et al. | 714/38 |
| 2005/0097118 A1 * | 5/2005 | Slutz | 707/101 |

* cited by examiner

*Primary Examiner* — Hosain Alam
*Assistant Examiner* — Johnese Johnson
(74) *Attorney, Agent, or Firm* — Patterson & Sheridan, LLP

(57) ABSTRACT

A computer-implemented method of testing a database can include the steps of constructing one or more data generation rules, receiving one or more user-defined objects associated with the database, and generating a set of data entries using the generation rules, wherein at least a portion of the generated data is correlated data.

16 Claims, 3 Drawing Sheets

DATABASE SYSTEM TESTING

FIELD OF THE INVENTION

The present invention is related to the field of database system testing, and more particularly, to systems and methods for generating test data for database system testing.

BACKGROUND

In general, automated testing tools for testing database systems typically utilize test databases to test functionality of the database system. However, these test databases typically do not include any type of customer data. Instead, such testing tools generally use a data generation algorithm to generate random data based on the possible range of data allowed for the test database. Accordingly, this random data typically includes data from a large data domain.

Accordingly, these types of data generation tools generally do not generate data that can be used for testing database features requiring correlated or related sets of data. For example, consider the following database query: select count (*) from myTable where MyColumn=?. Assuming that the data type of MyColumn is an integer type, a conventional data generation tool would fill MyColumn with random integer data, and then use the same algorithm to generate random data at runtime when the query is submitted. Consequently, the chance that the data generated at runtime can be found within the data stored inside myTable is very low. This can also occur in other situations, such as when attempting to test database features associated with joined tables or queries in stored procedures. Therefore, such dynamically generated queries typically return an empty result set, and limit the quality of testing possible.

SUMMARY

In a first embodiment of the present invention, a computer-implemented method of testing a database is provided. The method can include the steps of constructing one or more data generation rules, receiving one or more user-defined objects associated with the database, and generating a set of data entries using the generation rules, where at least a portion of the generated data is correlated data.

In a second embodiment of the present invention, a system for testing a database is provided. The system can include a rules generating element configured to construct one or more data generation rules and a data generating element configured to retrieve one or more user-defined objects associated with the database and generate a set of data entries according to the generation rules, where at least a portion of the generated data is correlated data.

In a third embodiment of the present invention, a computer-readable storage, having stored thereon a computer program for testing a database, is provided. The computer program can include a plurality of code sections, where the code sections are executable by a computer for causing the computer to perform the steps of constructing one or more data generation rules, receiving one or more user-defined objects associated with the database, and generating a set of data entries using the generation rules, where at least a portion of the generated data is correlated data.

DETAILED DESCRIPTION OF THE DRAWINGS

Embodiments of the present invention provide systems and method for generating test data for database systems, where the test data includes correlated or associated data. In the various embodiments of the present invention, the types of database objects requiring correlated data can be identified and rules for generating data for such objects or for elements within such objects can be constructed based on actual user requirements.

Figure 1:
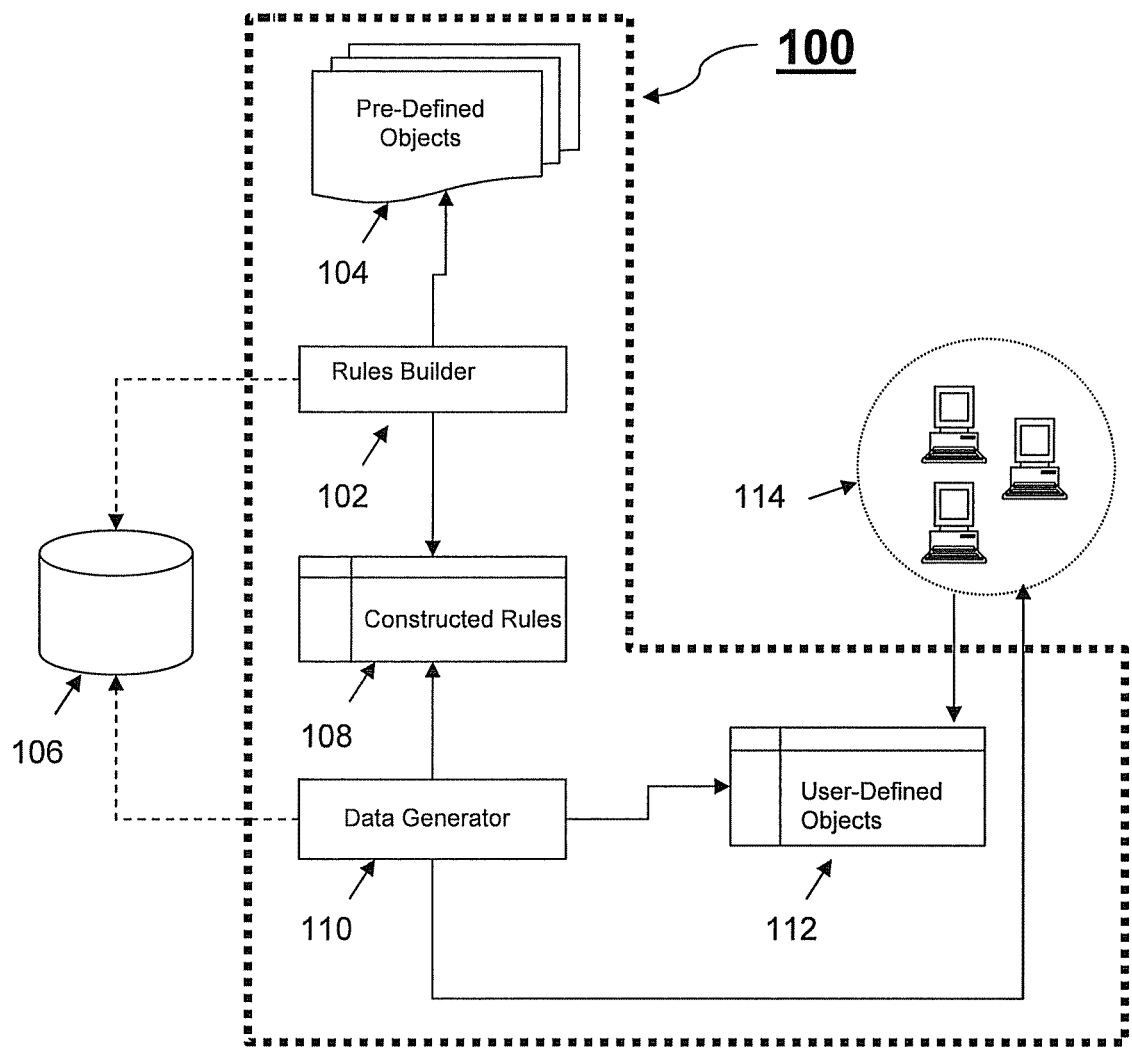
FIG. 1 is a schematic view of a exemplary system for testing databases according to an embodiment of the present invention.

FIG. 1 depicts an exemplary embodiment of a data generation system 100 for generating test data for a database system. As shown in FIG. 1, the system 100 can include a rules builder 102 for constructing rules for generating test data for database systems. According to embodiments of the present invention, the rules builder 102 can generate rules based on any number of predefined database objects within a pre-defined object store 104. The pre-defined objects can include any known or existing information about the database system or its operation database and can be expressed using any type of database query languages or information retrieval query languages. Pre-defined database objects can include, but are not limited to, database objects such as query statements, predicates in query statements, views, stored procedures, user defined functions, triggers, indexes, columns, user defined data types, primary keys, foreign keys, default and check constraints, variables, and any other known properties or functions associated with the database system at the time of constructing data generation rules. Pre-defined database objects can also include exemplary data from a data store 106. In such embodiments, this exemplary data can be used to determine, for example, the type of correlated data required for certain pre-defined objects. Any generation rules constructed by the rules builder 102 can be stored within a rules database 108.

The system 100 can also include a data generator 110 to generate test data for users. Test data, as used herein, can include not only entries for a test database, but also can include data sets to be used as inputs during testing of the database. The data generator 110 can generate rules based on a plurality of user-defined objects stored in a user object store 112 and the constructed rules in the rules database 108. The user object store 112 can receive user-defined objects from one or more user terminals 114. The user-defined objects, like pre-defined objects, can include any information about the database system or its operation. User-defined database objects can also include, but are not limited to, database objects such as views, stored procedures, user-defined functions, triggers, indexes, columns, user-defined data types, primary keys, foreign keys, default and check constraints, variables, and any other known properties or functions defined by the users for the database system at the time of generating the data. User-defined database objects can also include exemplary data from the data store 106. In such embodiments, this exemplary data can used to determine, for example, the type or characteristics for correlated data being generated the users. The data generator 102 can deliver any generated data to the users via the user terminals 114.

In the illustrated embodiment, FIG. 1 depicts the rules builder 102, the data generator 110, the rules database 108, the data store 106, and the pre-defined and user-defined object stores 104, 112, as separate components. However, it is also within the scope of the present invention to combine the functions of one or more of these components into a single system or to provide a distributed system for performing these functions.

Figure 2:
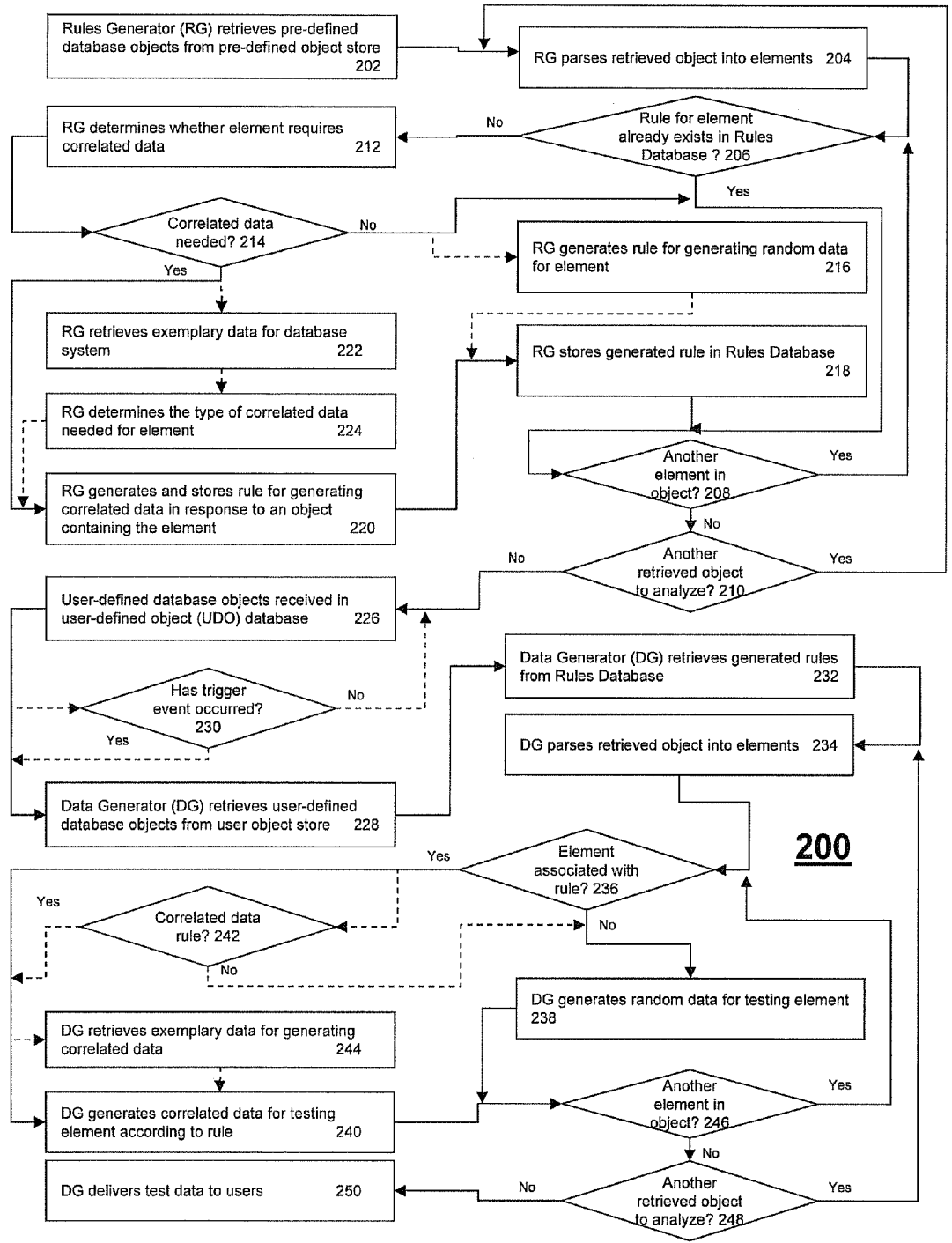
FIG. 2 is a flowchart of steps in an exemplary method for testing databases according to an embodiment of the present invention.

FIG. 2 is a flowchart illustrating steps in an exemplary method 200 for generating test data for a database system according to an embodiment of the present invention. In step 202, the rules builder can retrieve the pre-defined database objects. The rules builder can then process these objects by parsing the objects into elements in step 204. In the various embodiments of the invention, the elements of a pre-defined database object can comprise any identifiable portions or sub-sections of the pre-defined object. By way of example and not by way of limitation, if the database object is an SQL procedure, the elements can be defined as the statements used to define the procedure. Alternatively, the SQL procedure can be further broken down, and the elements for the SQL procedure can be defined as the various SQL language components used in the SQL procedure. Similarly, objects in any other query languages can be similarly broken down.

In the various embodiments, the parsing process can occur in one step or in multiple steps. For example, a rules builder configured to process SQL statements and procedures can include a statement analyzer for processing the database objects. The statement analyzer can be configured include a statement parser to identify individual statements as elements. However, the statement analyzer can also be configured to include a predicates parser, such that after the statements are identified, the predicates within the individual statements can also be identified. Therefore, in the various embodiments, the rules builder can be configured to break down the pre-defined objects as needed for the rule construction process.

Once an object has been parsed in step 204, the method 200 can determine if a rule already exists for an element identified in the database object in step 206. If a rule already exists, the method 200 can check if another element has been located within the object in step 208. If the method 200 finds in step 208 that another element is present in pre-defined object, step 206 and any subsequent steps can be repeated. If no other elements are located within the pre-defined object, the method 200 can check in step 210 if another pre-defined object still needs to be analyzed. If the method 200 finds in step 210 that another pre-defined database object needs to be analyzed, step 204 and any subsequent steps can be repeated.

In response to determining that no rule is specified for the element in step 206, the method 200 can determine in step 212 whether any type of correlated data is needed for the element. If no correlated data is needed for the element in step 214, then randomly generated data will be sufficient to test the functionality of the element in a database system. However, in some embodiments, a rule can also be constructed in step 216 to provide for the generation of random data. For example, a rule can specify that data can be randomly generated for an element, but that the data needs to be provided in a specific format. The rule can then be stored within the rules database in step 218. Afterwards, any other remaining elements can be analyzed using step 208 and any subsequent steps.

If correlated data is required for the element in step 214, embodiments of the present invention provide for constructing a rule to generate correlated data in response to determining that a user-defined object includes the element in step 220. In some embodiments, the rule can also be based not only on an analysis of the pre-defined element, but also on exemplary data. For example, exemplary data can be retrieved in step 222. The exemplary data can include one or more data sets which can be used to test the functionality of the elements in the pre-defined objects. Accordingly, in step 224, the rules builder can apply the element to the exemplary database and, according to the response, determine the type of correlated data required by the element. For example, by testing the various elements using the exemplary database, the rules builder can determine under which circumstances the exemplary database returns empty responses and can adjust the rules accordingly in step 220 so that data is generated to provide non-empty responses. Upon construction of the rule in step 220, the method can then store the rule in step 218, as previously described, and analyze the remaining elements and/or objects starting with step 208.

In method 200, the constructed rule specifies the generation of a single data set for each element. However, the invention not limited in this regard. In the various embodiments of the present invention, an element can require multiple sets of data to test its functionality. Therefore, in the various embodiments of the present invention, one or more rules can be generated for each element, each specifying how to construct one or more data sets. Additionally, although the exemplary embodiment only shows the rules are generated to provide either random data or correlated data, it is also within the scope of the present invention to provide one or more rules for generating both types of data for a single element. It is also within the scope of the present invention to provide multiple exemplary databases. In such embodiments, the exemplary databases can be configured to provide responses for certain types of elements. Therefore, an element can be tested against one or more of these databases to determine the necessary types of data sets that need to be generated for that element and to adjust and/or construct rules accordingly.

After the rules builder has analyzed all the pre-defined objects and determined and stored all necessary generation rules in steps 202-224, the method 200 can provide for generation of data in response to user input. In the various embodiments of the present invention, data generation can be performed multiple times, in order to add data sets that are needed to test user-defined objects after an initial data set is generated.

In step 226, the method 200 can receive user-defined database objects in a user object store. In some embodiments, the data generator can retrieve the user-defined objects as soon as they are received in the user object store and begin the data generation process. However, in other embodiments the data generator can be configured to retrieve the user-defined objects and begin the data generation process only in response to some triggering event. In such embodiments, if the triggering event is not detected in step 230, the user object store can continue to receive and store user-defined database objects in step 226.

In embodiments of the present invention requiring a triggering event, the type of triggering event used can vary. For example, a triggering event can be the passage of a fixed period of time or the receipt of a certain number of user-defined objects. In development environments where the same data set is used by multiple users, this can help limit the number of times the data set needs to be generated to account for only minor changes. For example, in cases where multiple users submit user-defined data objects represent small, incremental changes in the database system, immediate regeneration of the data may be considered unnecessary and wasteful of resources. Therefore, waiting for a triggering event can be a more efficient use of the resources available. In another example, a triggering event can be the receipt of a database object that is tagged as critical. In such embodiments, the data can be regenerated, regardless of the number of changes.

Similarly, the data can be regenerated in response to a user or administrator command. These examples of triggering events are presented by way of example and not by way of limitation. Therefore, it is within the scope of the present invention for the data generator to begin the data generation process in response to any type of condition or signal.

Therefore, once the data generation process begins, the data generation can first retrieve the user-defined database objects from the user object store in step 228. Subsequently or in combination with step 228, the data generator can also retrieve the rules stored in the rules database in step 232. The data generator first begins by parsing the user-defined objects into elements in step 234. The data generation rules can then be analyzed to determine if a rule exists for generating data for an element in the user-defined object. If no rule exists in step 236, then the data generator generates random data for the element in step 238. Otherwise, the data generator generates the necessary correlated data in step 240. In some embodiments, where a rule is constructed to generate random data for pre-defined elements, the method 200 can include a step of determining whether the rule applicable to the element specifies generation of correlated data in step 242. If the rule specifies correlated data in step 242, the method can proceed to step 240 to generate the data. If the rule specifies random data, the method can proceed to step 236, as previously discussed, to generate the random data.

In other embodiments, the correlated data can be required to have specific characteristics. For example, related data sets can be expected to have a particular type of relationship. In such embodiments, the rules for generating correlated data can be configured to accept data from an exemplary database to provide these characteristics. In at least one embodiment, such relationships can be extracted or otherwise provided by retrieving an exemplary database from a data store in step 244. In these embodiments, multiple exemplary databases can be used to generate the data. Furthermore, such databases can be specified by the user within the user-defined objects or can be already known to the data generator.

After the data is generated for an element, method 200 can check to see if data still needs to be generated for other elements and/or objects. For example, in step 246, the method 200 can check if other elements of the object still need data generated. If data for other elements still needs to be generated in step 246, the method 200 can repeat step 234 and any subsequent steps to generate data for the other elements. If no other elements remain in the object, the method 200 can determine in step 248 can determine any other user-defined objects need to be processed. If other objects remain to be processed in step 248, the method 200 can repeat step 232 and subsequent steps to process the remaining user-defined objects. Otherwise, the data generator can deliver the final set of data to the users in step 250.

Upon reviewing the aforementioned embodiments, it would be evident to one of ordinary skill in the art that the embodiments can be modified, reduced, or enhanced without departing from the scope and spirit of the claims described below. For example, in some embodiments, the data generator can be configured to provide customized sets of data for different users. In such embodiments, the data generator can be configured to generate data sets using only the user-defined object associated with a single user or a specific group of users. In other embodiments, as user-defined objects are received and processed, the objects can be transferred to the pre-defined object store for use in subsequent generation of additional rules. In some of these embodiments, the user-defined objects can be transferred selectively. In yet other embodiments, a triggering event can also be used to trigger rule construction. In such embodiments, a same or a different triggering event can be used to trigger the rule construction process. In still other embodiments, the rules generator can be configured to generate rules using only a portion of the elements in a pre-defined object. For example, the rules generator can parse an object into two elements that can be used to construct a rule. Afterwards, the rules generator can analyze both elements to determine which element is associated with a simpler data generation rule use the element to generate the rule. However, in the various embodiments of the present invention, any set of criteria can be used to limit the number or type of elements within an object to use for constructing rules.

Figure 3:
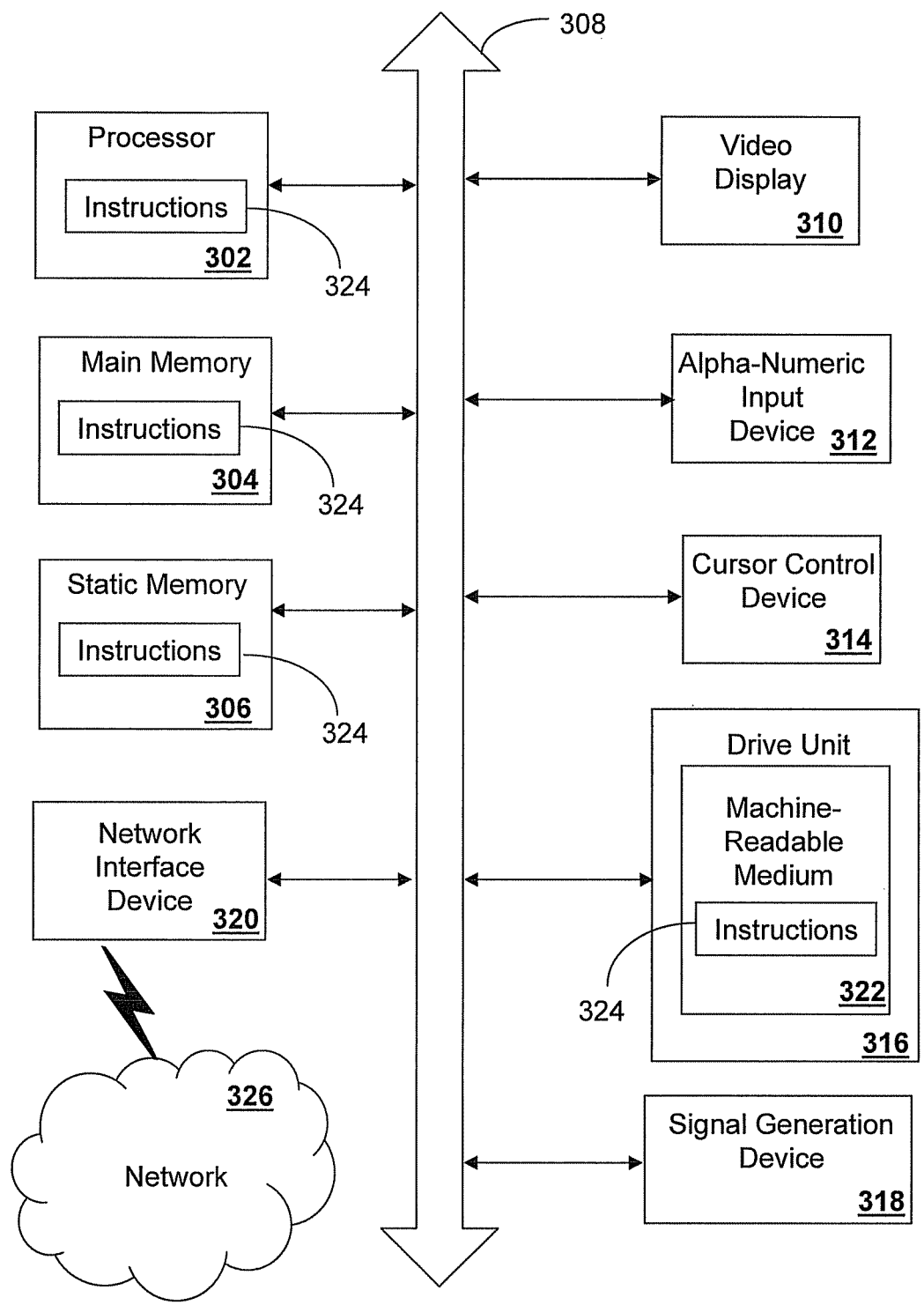
FIG. 3 is a schematic view of a computer system within which a set of instructions operate according to an embodiment of the invention.

FIG. 3 is a schematic diagram of a computer system 300 for executing a set of instructions that, when executed, can cause the computer system to perform one or more of the methodologies and procedures described above. In some embodiments, the computer system 300 operates as a standalone device. In other embodiments, the computer system 300 can be connected (e.g., using a network) to other computing devices. In a networked deployment, the computer system 300 can operate in the capacity of a server or a client developer machine in server-client developer network environment, or as a peer machine in a peer-to-peer (or distributed) network environment.

The machine can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 300 can include a processor 302 (such as a central processing unit (CPU), a graphics processing unit (GPU, or both), a main memory 304 and a static memory 306, which communicate with each other via a bus 308. The computer system 300 can further include a display unit 310, such as a video display (e.g., a liquid crystal display or LCD), a flat panel, a solid state display, or a cathode ray tube (CRT)). The computer system 300 can include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 can include a computer-readable storage medium 322 on which is stored one or more sets of instructions 324 (e.g., software code) configured to implement one or more of the methodologies, procedures, or functions described herein. The instructions 324 can also reside, completely or at least partially, within the main memory 304, the static memory 306, and/or within the processor 302 during execution thereof by the computer system 300. The main memory 304 and the processor 302 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable storage medium containing instructions 324 or that receives and executes instructions 324 from a propagated signal so that a device connected to a network environment 326 can send or receive voice and/or video data, and that can communicate over the network 326 using the instructions 324. The instructions 324 can further be transmitted or received over a network 326 via the network interface device 320. and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other While the computer-readable storage medium 322 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, embodiments not specifically described herein, will be apparent to those of skill in the art upon reviewing the above description.

What is claimed is:

1. A method of generating test data for a first database, comprising:

for each of a plurality of database objects associated with the first database, determining one or more elements by parsing a database query language representation of the database object, the database query language representation comprising one or more SQL statements which, when executed, create the corresponding database object in the first database;

analyzing a second database to determine one or more correlations between elements in the second database, wherein the second database is provided as a model for the first database;

constructing one or more data generation rules for the determined one or more elements wherein the one or more data generation rules are configured for use in generating correlated test data corresponding to the one or more elements;

receiving a user-defined database object specifying at least one of the elements for one of the plurality of database objects; and generating, by operation of one or more computer processors, a set of test data for the first database and corresponding to the at least one element specified in the user-defined database object, wherein the set of test data comprises a plurality of correlated data entries, and wherein the set of test data is generated using the one or more data generation rules and is further based on the determined one or more correlations between elements in the second database.

2. The method of claim 1, further comprising:

determining whether the at least one element specified in the user-defined database object references a set of correlated data entries.

3. The method of claim 2, wherein one or more characteristics of the generated set of test data are derived from at least one among a function of the at least one element, a function of the user-defined database object, and a set of exemplary correlated data.

4. The method of claim 1, wherein analyzing the second database further comprises:

performing an empty response test by querying the second database using a test data value; and adjusting the one or more data generation rules, if querying the second database using the test data value does not return an empty response.

5. The method of claim 1, further comprising:
distributing the set of test data to a plurality of users;
collecting one or more new user-defined objects associated with the first database; and
responsive to a triggering event, repeating the generating and distributing steps.

6. The method of claim 5, wherein the triggering event is at least one among an a pre-defined time interval expiring, a number of the new user-defined objects exceeding a threshold value, at least one of the new user-defined objects specifying a critical database object, and receiving a triggering command.

7. A system, comprising:
a processor; and
a memory containing a program that, when executed by the processor, performs an operation for generating test data for a first database, the operation comprising:
for each of a plurality of database objects associated with the first database, determining one or more elements by parsing a database query language representation of the database object, the database query language representation comprising one or more SQL statements which, when executed, create the corresponding database object in the first database;
analyzing a second database to determine one or more correlations between elements in the second database, wherein the second database is provided as a model for the first database;
constructing one or more data generation rules for the determined one or more elements, wherein the one or more data generation rules are configured for use in generating correlated test data corresponding to the one or more elements;
receiving a user-defined database object specifying at least one of the elements for one of the plurality of database objects; and
generating a set of test data for the first database and corresponding to the at least one element specified in the user-defined database object, wherein the set of test data comprises a plurality of correlated data entries, and wherein the set of test data is generated using the one or more data generation rules and is further based on the determined one or more correlations between elements in the second database.

8. The system of claim 7, the operation further comprising:
determining whether the at least one element specified in the user-defined database object references a set of correlated data entries.

9. The system of claim 8, wherein one or more characteristics of the generated set of test data are derived from at least one among a function of the at least one element, a function of the user-defined database object, and a set of exemplary correlated data.

10. The system of claim 7, the operation further comprising:
distributing the set of test data to a plurality of users;
collecting one or more new user-defined objects associated with the first database; and
responsive to a triggering event, repeating the generating and distributing of the set of data entries.

11. The system of claim 10, wherein the triggering event is at least one among a pre-defined time interval expiring, a number of the new user-defined objects exceeding a threshold value, at least one of the new user-defined objects specifying a critical database object, and receiving a triggering command.

12. A non-transitory computer-readable medium containing a program that, when executed, performs an operation comprising:
for each of a plurality of database objects associated with the first database, determining one or more elements by parsing a database query language representation of the database object, the database query language representation comprising one or more SQL statements which, when executed, create the corresponding database object in the first database;
analyzing a second database to determine one or more correlations between elements in the second database, wherein the second database is provided as a model for the first database;
constructing one or more data generation rules for the determined one or more elements, wherein the one or more data generation rules are configured for use in generating correlated test data corresponding to the one or more elements;
receiving a user-defined database object specifying at least one of the elements for one of the plurality of database objects; and
generating a set of test data for the first database and corresponding to the at least one element specified in the user-defined database object, wherein the set of test data comprises a plurality of correlated data entries, and wherein the set of test data is generated using the one or more data generation rules and is further based on the determined one or more correlations between elements in the second database.

13. The non-transitory computer-readable medium of claim 12, the operation further comprising:
determining whether the at least one element specified in the user-defined database object references a set of correlated data entries.

14. The non-transitory computer-readable medium of claim 13, wherein one or more characteristics the generated set of test data are derived from at least one among a function of the at least one element, a function of the user-defined database object, and a set of exemplary correlated data.

15. The non-transitory computer-readable medium of claim 12, the operation further comprising:
distributing the set of test data to a plurality of users;
collecting one or more new user-defined objects associated with the first database; and
responsive to a triggering event, repeating the generating and distributing steps.

16. The non-transitory computer-readable medium of claim 15, wherein the triggering event is at least one among an a pre-defined time interval expiring, a number of the new user-defined objects exceeding a threshold value, at least one of the new user-defined objects specifying a critical database object, and receiving a triggering command.

* * * * *